(12) United States Patent
Hong et al.

(10) Patent No.: US 9,718,496 B2
(45) Date of Patent: Aug. 1, 2017

(54) REAR SIDE MEMBER

(71) Applicants: Hyundai Motor Company, Seoul (KR); Kia Motors Corporation, Seoul (KR)

(72) Inventors: Deok Hwa Hong, Gyeonggi-do (KR); Hee Seouk Chung, Gyeonggi-do (KR)

(73) Assignees: Hyundai Motor Company, Seoul (KR); Kia Motors Coporation, Seoul (KR)

( * ) Notice: Subject to any disclaimer, the term of this patent is extended or adjusted under 35 U.S.C. 154(b) by 13 days.

(21) Appl. No.: 14/943,757

(22) Filed: Nov. 17, 2015

(65) Prior Publication Data

US 2017/0073015 A1    Mar. 16, 2017

(30) Foreign Application Priority Data

Sep. 10, 2015  (KR) .................. 10-2015-0128616

(51) Int. Cl.
*B62D 21/15* (2006.01)
*B62D 25/08* (2006.01)
*B62D 29/00* (2006.01)

(52) U.S. Cl.
CPC ......... *B62D 21/155* (2013.01); *B62D 29/008* (2013.01); *B62D 25/08* (2013.01)

(58) Field of Classification Search
CPC .... B62D 21/15; B62D 21/152; B62D 21/155; B62D 25/08; B62D 25/20; B62D 25/2027; B62D 25/087; B62D 29/008
USPC ............................ 296/187.09, 187.11, 203.04
See application file for complete search history.

(56) References Cited

U.S. PATENT DOCUMENTS

| | | | | |
|---|---|---|---|---|
| 4,708,391 A | * | 11/1987 | Nakano | B60G 11/16 296/204 |
| 5,110,177 A | * | 5/1992 | Akio | B62D 21/11 280/784 |
| 5,174,628 A | * | 12/1992 | Hayatsugu | B60K 15/03 296/187.11 |
| 6,450,567 B2 | * | 9/2002 | Toba | B62D 25/08 296/187.11 |
| 6,938,948 B1 | * | 9/2005 | Cornell | B62D 21/155 296/187.09 |
| 7,273,247 B2 | * | 9/2007 | Grueneklee | B62D 21/07 296/204 |

(Continued)

FOREIGN PATENT DOCUMENTS

| | | |
|---|---|---|
| JP | 2005-119488 A | 5/2005 |
| JP | 2007-038717 A | 2/2007 |

(Continued)

*Primary Examiner* — Gregory Blankenship
(74) *Attorney, Agent, or Firm* — Mintz Levin Cohn Ferris Glovsky and Popeo, P.C.; Peter F. Corless (57) ABSTRACT

A rear side member mounted to extend from both sides of a latter half portion of a vehicle body toward a rear of the vehicle is provided. In particular, the rear side member includes fuel tank sections formed as a foremost portion that corresponds to a position of the fuel tank, and rear subframe sections that extend toward a rear of the fuel tank sections and that correspond to a position of a rear subframe. Tire well sections extend backward from the rear subframe sections and correspond to a position of a tire well. Further, the thicknesses of members of the fuel tank sections, the rear subframe sections, and the tire well sections are different.

10 Claims, 3 Drawing Sheets

(56) References Cited

U.S. PATENT DOCUMENTS

| | | | | |
|---|---|---|---|---|
| 8,870,274 B2* | 10/2014 | Mildner | ................ | B62D 25/02 296/187.11 |
| 9,266,564 B1* | 2/2016 | Arora | ................ | B60R 19/02 |
| 9,308,805 B2* | 4/2016 | Shiromura | ................ | B60K 1/04 |
| 2004/0195862 A1* | 10/2004 | Saeki | ................ | B62D 21/152 296/187.09 |
| 2004/0200659 A1* | 10/2004 | Miyasaka | ................ | B62D 21/155 180/312 |
| 2008/0238146 A1* | 10/2008 | Nusier | ................ | B62D 21/152 296/193.09 |
| 2010/0096887 A1* | 4/2010 | Mori | ................ | B62D 21/152 296/203.02 |
| 2011/0121613 A1* | 5/2011 | Souma | ................ | B62D 21/152 296/203.04 |
| 2011/0175401 A1* | 7/2011 | Fujimura | ................ | B62D 25/2027 296/203.04 |
| 2011/0233961 A1* | 9/2011 | Verbrugge | ................ | B21C 23/085 296/187.03 |
| 2011/0290838 A1* | 12/2011 | Souma | ................ | B62D 43/10 224/492 |
| 2015/0239504 A1* | 8/2015 | Lohmann | ................ | B62D 25/025 296/187.11 |
| 2015/0344072 A1* | 12/2015 | Mildner | ................ | B62D 21/152 296/187.11 |
| 2016/0129941 A1* | 5/2016 | Kim | ................ | B60R 19/023 296/187.09 |
| 2016/0159400 A1* | 6/2016 | Matsuoka | ................ | B62D 21/152 296/187.11 |
| 2016/0194030 A1* | 7/2016 | Patberg | ................ | B62D 21/152 296/187.03 |
| 2016/0362139 A1* | 12/2016 | Sekiguchi | ................ | B62D 21/02 |

FOREIGN PATENT DOCUMENTS

| | | |
|---|---|---|
| JP | 2011-143881 A | 7/2011 |
| JP | 2014-148211 A | 8/2014 |
| KR | 10-0974554 B1 | 8/2010 |
| KR | 10-2013-0032435 A | 4/2013 |
| KR | 10-1490923 B1 | 2/2015 |

* cited by examiner

REAR SIDE MEMBER

CROSS REFERENCE TO RELATED APPLICATION

The present application claims priority to Korean Patent Application No. 10-2015-0128616, filed Sep. 10, 2015, the entire contents of which is incorporated herein for all purposes by this reference.

BACKGROUND

Field of the Invention

The present invention relates to a rear side member in an underbody structure for a vehicle and more particularly, to improving passenger safety by securing an interior space of the vehicle while absorbing shock upon a vehicle collision.

Description of the Related Art

Recently, design technology of an underbody structure for a vehicle has been developed to improve passenger safety by preventing shock from a vehicle collision from being delivered into the interior (e.g., passenger compartment) of the vehicle while absorbing shock from the vehicle collision. In particular, to absorb the shock delivered into the vehicle upon the vehicle collision, a portion of the underbody structure for a vehicle is configured to be deformation in an accordion shape to absorb shock delivered into the vehicle. Therefore, a portion of the underbody structure bends to absorb the shock, and a portion of the underbody secures a space to prevent the interior space of the vehicle from being reduced to ensure passenger safety. However, absorbing the shock and securing the interior space of the vehicle conflict with each other. Therefore, the technology required for compatibility between the functions of shock absorption and securing interior space of the vehicle is required.

In particular, upon the rear collision, when a fuel tank disposed within the rear of the vehicle sustains damage the fuel may begin to leak potentially causing an explosive accident. Therefore, balancing the two functions of absorbing the shock and securing the safety space is critically important. In other words, when the underbody structure for a vehicle is designed to have high strength, the function of absorbing shock may deteriorate. When the underbody structure for a vehicle is designed to have low strength, the shock may be absorbed but the interior space of the vehicle may not be structurally maintained and the passenger safety may not be ensured.

The above information disclosed in this section are intendent merely for assisting in the understanding for the background of the present invention and therefore may contain information that does not form the prior art that is known to those skilled in the art.

SUMMARY

The present invention provides a rear side member capable of reducing the weight by removing reinforcing components to have different thicknesses for each section within one component to distribute strength to be suited for purposes of each section.

In one aspect, an exemplary embodiment provides a rear side member mounted to extend from both sides of a latter half portion of a vehicle body toward a rear of the vehicle, that may include fuel tank sections having a foremost portion and that corresponds to a position of the fuel tank; rear subframe sections that extend toward a rear of the fuel tank sections and correspond to a position of a rear subframe; and tire well sections that extend backward from the rear subframe sections and correspond to a position of a tire well, in which thicknesses of members of the fuel tank sections, the rear subframe sections, and the tire well sections may be different.

The fuel tank sections may be include a first section formed as front end portions of the fuel tank sections and coupled to a center floor and a second section having rear end portions of the fuel tank sections, that extend from the first section, and are coupled to the rear subframe sections. Additionally, thicknesses of members the first section and the second section may be different.

The rear subframe sections may be include a third section formed as front end portions of the rear subframe sections and mounted with a front end fastening component of the rear subframe, a fourth section that extends backward from the third section, and a fifth section that extends backward from the fourth section, mounted with a rear end fastening component of the rear subframe, and may be coupled to the tire well sections. Additionally, thicknesses of members of the third section, the fourth section, and the fifth section may be different. The tire well sections may be include a sixth section having front end portions of the tire well sections that extends backward from the rear subframe sections and a seventh section extending backward from the sixth section. Further, the thicknesses of members of the sixth section and the seventh section may be different.

In one exemplary embodiment, a thickness of the first section may be a first thickness T1 and a thickness of the second section may be a second thickness T2. A correlation between the thicknesses for each section may be that a second thickness is greater than a first thickness (e.g., T2>T1). A thickness of the third section that may be a third thickness T3, a thickness of the fourth section may be a fourth thickness T4, and a thickness of the fifth section may be a fifth thickness T5. A correlation between the thicknesses for each section may be that the fifth thickness is greater than the fourth thickness and the fourth thickness is greater than the third thickness (e.g., T5>T4>T3). A thickness of the sixth section may be a sixth thickness T6 and a thickness of the seventh section may be a seventh thickness T7. A correlation between the thicknesses for each section may be that the sixth thickness is greater than the seventh thickness (e.g., T6>T7).

The fuel tank sections may include a first section formed as front end portions of the fuel tank sections coupled to a center floor and a second section formed as rear end portions of the fuel tank sections, that extend from the first section, and are coupled to the rear subframe sections. Further the rear subframe sections may include a third section formed as front end portions of the rear subframe sections and mounted with a front end fastening component of the rear subframe. A fourth section may extend backward from the third section, and a fifth section may extend backward from the fourth section, and may be mounted with a rear end fastening component of the rear subframe, and coupled to the tire well sections. The tire well sections may include a sixth section formed as front end portions of the tire well sections and extending backward from the rear subframe sections and a seventh section may extend backward from the sixth section. Further a correlation between the whole thicknesses of the first section to the seventh section may be that a sixth thickness is greater than a seventh thickness, the seventh thickness is greater than a fifth thickness, the fifth thickness is greater than a fourth thickness, the fourth thickness is greater than a third thickness, the third thickness is greater than a second thickness and the second thickness is greater than a first thickness (e.g., $T6>T7>T5>T4>T3>T2>T1$).

The correlation between the whole thicknesses of the first section to the seventh section may be that the sixth thickness is greater than the seventh thickness, the seventh thickness is greater than the fifth thickness, the fifth thickness is greater than the fourth thickness, the fourth thickness is greater than the third thickness, the third thickness is equal to the second thickness and the second thickness is greater than the first thickness (e.g., $T6>T7>T5>T4>T3=T2>T1$). The correlation between the whole thicknesses of the first section to the seventh section may be that the sixth thickness is greater than the seventh thickness, the seventh thickness is equal to the fifth thickness, the fifth thickness is greater than the fourth thickness, the fourth thickness is greater than the third thickness, the third thickness is greater than the second thickness and the second thickness is greater than the first thickness (e.g., $T6>T7=T5>T4>T3>T2>T1$).

A first section of the rear side member may be coupled with both ends of a cross member crossing the vehicle body in a width direction. The thicknesses for each section may be manufactured differently for each section by a tailor rolled blanks (TRB) method. As described above, according to the rear side member according to the exemplary embodiments of the present invention, the weight of the underbody structure for a vehicle may be reduced by removing the reinforcing components manufactured to have different thicknesses for each section to distribute the strength suited for purposes of each section.

BRIEF DESCRIPTION OF THE DRAWINGS

The above and other objects, features and other advantages of the present invention will be more clearly understood from the following detailed description when taken in conjunction with the accompanying drawings.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
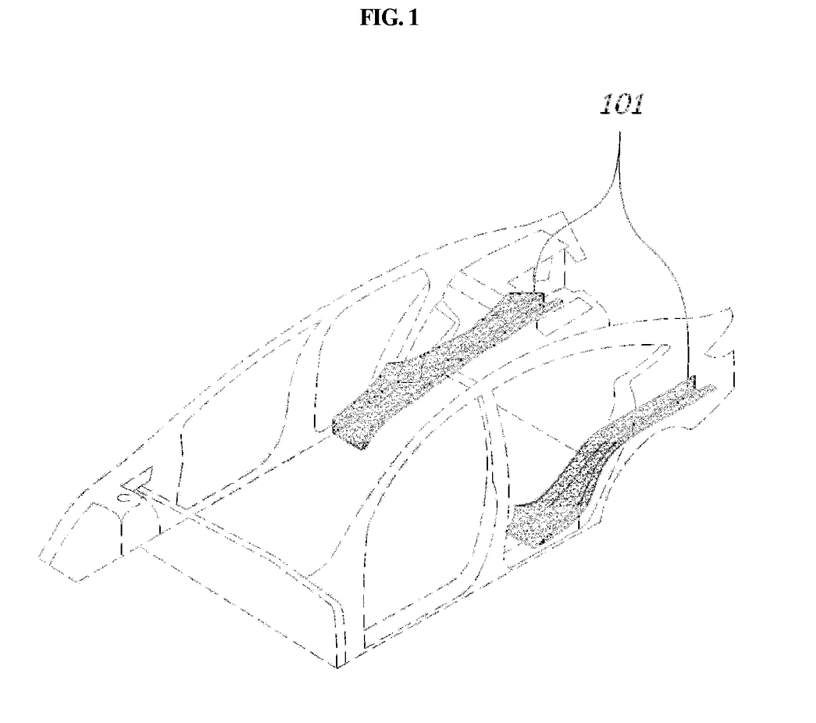
FIG. 1 is an exemplary configuration diagram of a rear side member according to an exemplary embodiment of the present invention.
Figure 2:
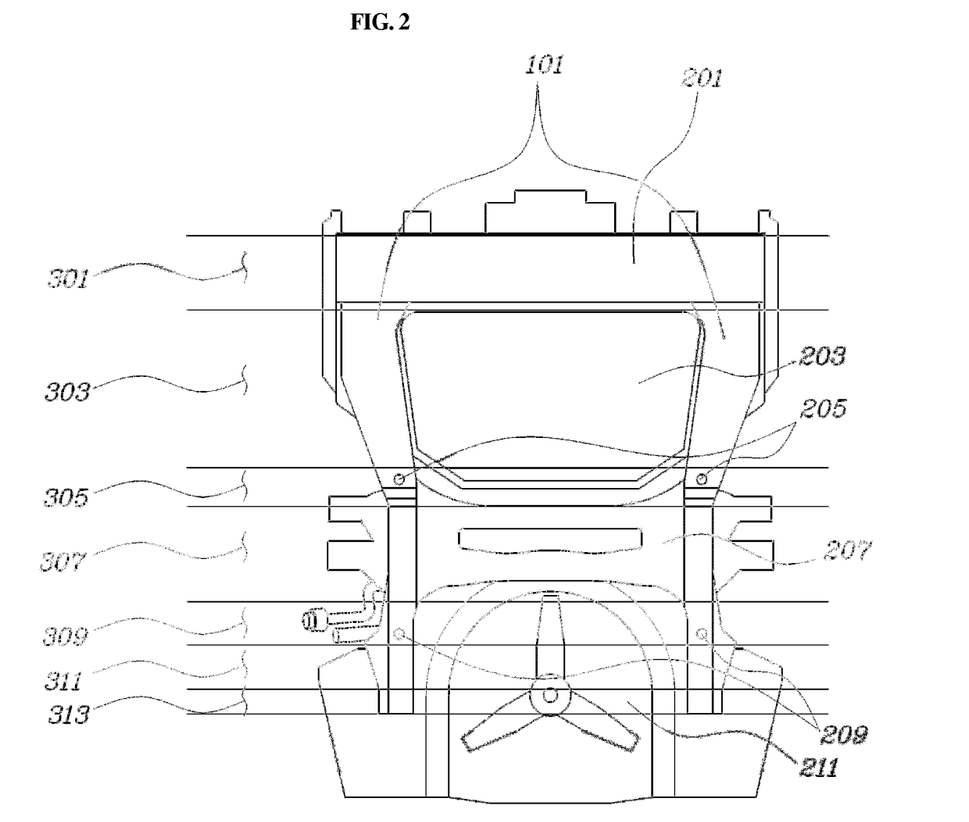
FIG. 2 is an exemplary plan view of a section disposition of the rear side member according to the exemplary embodiment of the present invention.
Figure 3:
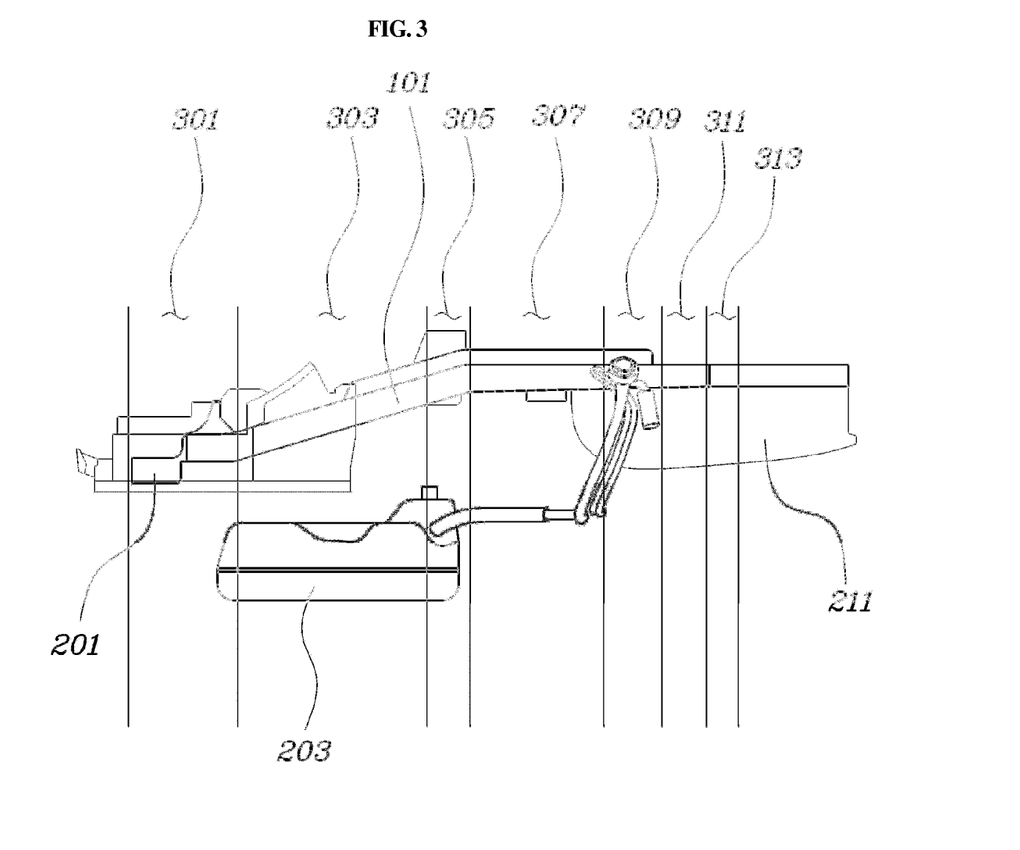
FIG. 3 is an exemplary side view of a section disposition of the rear side member according to the exemplary embodiment of the present invention.

FIG. 1 is an exemplary configuration diagram of a rear side member according to an exemplary embodiment of the present invention. FIG. 2 is an exemplary plan view of a section disposition of the rear side member according to the exemplary embodiment of the present invention. FIG. 3 is an exemplary side view of a section disposition of the rear side member according to the exemplary embodiment of the present invention.

Referring to FIGS. 2 and 3, a rear side member 101 mounted to extend from both sides of a latter half portion of a vehicle body toward a rear of the vehicle may include fuel tank sections 301 and 303 formed as a foremost portion that correspond to a position of the fuel tank 203, rear subframe sections 305, 307, and 309 that extend toward a rear of the fuel tank sections 301 and 303 and correspond to a position of a rear subframe 207, and tire well sections 311 and 313 that extend backward from the rear subframe sections 305, 307, and 309 and correspond to a position of a tire well. The thicknesses of members of the fuel tank sections 301 and 303, the rear subframe sections 305, 307, and 309, and the tire well sections 311 and 313 may be different.

The fuel tank sections 301 and 303 may include a first section 301 formed as front end portions of the fuel tank sections 301 and 303 and may be coupled to a center floor and a second section 303 formed as rear end portions of the fuel tank section 301 and 303, that extend from the first section 301, and may be coupled to the rear subframe sections 305, 307, and 309. The thicknesses of members the first section 301 and the second section 303 may be different.

The rear subframe sections 305, 307, and 309 may include a third section 305 formed as front end portions of the rear subframe sections 305, 307, and 309 and may be mounted with a front end fastening component of the rear subframe 207, a fourth section 307 may extend backward from the third section 305, and a fifth section 309 may extend backward from the fourth section 307, and may be mounted with a rear end fastening component 209 of the rear subframe 207, and may be coupled to the tire well sections 311 and 313. The thicknesses of members of the third section 305, the fourth section 307, and the fifth section 309 may be different.

The tire well sections 311 and 313 may include of a sixth section 311 formed as front end portions of the tire well sections 311 and 313 that extend backward from the rear subframe sections 305, 307, and 309 and a seventh section 313 that extends backward from the sixth section 311. The thicknesses of members of the sixth section 311 and the seventh section 313 may be different.

Referring to FIG. 1, the rear side member 101 may be one of the members formed as an underbody of the vehicle body and may support from a rear of a back seat up to a position of a trunk. The underbody structure of the vehicle body may absorb shock that occurs during vehicle collisions to minimize the delivery of the shock to a passenger compartment, thereby protecting passengers. When the underbody structure is made of a high strength material to prevent a vehicle body from being deformed, the underbody structure may maintain the integrity of the space of the passenger compartment but may not absorb shock energy and may deliver the absorbed shock energy to passengers. Accordingly, the passengers may suffer injury. Conversely, even though the vehicle body may be deformed to adequately absorb the energy upon impact during the vehicle collision, when the space of the passenger is not secured, the passengers may also suffer injury. In particular, the deformation of the vehicle body and the preservation of the space within the passenger compartment should be reconciled.

A method for protecting, by the underbody structure, passengers from a shock may include a plurality of solutions. In an exemplary embodiment, the method for protecting, passengers from a shock may include absorbing energy by compressing and deforming a member configuring the underbody upon the vehicle collision. In an alternate exemplary embodiment, the method for protecting passengers from a shock may include absorbing energy by a bending deformation in conjunction with a deformation of a rigid body when a surrounding rigid body encounters resistance upon compression and deformation of a member. In another aspect, the method for protecting, by the underbody structure, passengers from a shock is a method for protecting passengers by preserving a portion into which passengers enter or a space in which key components exist.

Therefore, there is a need to make thickness and rigidity of a component diverse based on whether energy needs to be absorbed even in the component by the deformation or whether there is a need to secure an absolute space itself using the component. The related art used a method for adding a reinforcing member to a portion where strength reinforcement is required for each component. However, the method may increase assembling costs due to the addition of the reinforcing member and has an insignificant improvement effect of strength by bonding the reinforcing member to a main member by welding.

The rear side member 101 according to the exemplary embodiment of the present invention may maintain rigidity and secure a compartment to prepare for a shock applied from the rear of the vehicle body and prevent the damage of the key components such as the fuel tank 203. However, deformations may be differentiated based on a role and a degree of contribution upon the vehicle collision even within the same component. Based on the differentiation, sections are may be selected and thicknesses of the components may be machined differently to reduce a weight and production costs while maximizing the absorption of shock power and the space security performance upon the vehicle collision.

Referring to FIGS. 2 and 3, the first section 301 of the fuel tank sections 301 and 303 may be coupled to the center floor of the front and may transfer a shock received through the rear side member 101 to the center floor and disperse the shock. Therefore, the first section 301 may require rigidity to effectively disperse a shock. The second section 303 may include a body of the fuel tank 203 and rigidity may be required to secure a space to prevent damage from an external shock.

The third section 305 of the subframe sections may be position proximate to a position where a front end portion of the subframe is mounted and coupled. Further, the section requires rigidity to be maintained for coupling robustness. The fourth section 307 may include the rear subframe 207 disposed therein and may include a section that requires rigidity to secure a space upon the vehicle collision together with the rear subframe 207 that may be a rigid body. The fifth section 309 may include a section that requires rigidity to be maintained for the coupling robustness, as a position where a rear end portion of the subframe is mounted and coupled.

The sixth section 311 of the tire well sections 311 and 313 may be positioned at a rear of the filler neck and may be required for rigidity maintenance as a section to prevent a damage of a filler neck that serves as an inlet of the fuel tank 203. The seventh section 313 may include an additional coupled member that corresponds to a length of the vehicle body and a section which maintains rigidity that transfers shock energy upon the rear collision.

As described above, the rear side member 101 maintains rigidity over the whole of components but may have different thicknesses for each section and may include different rigidities. When the rear collision occurs, a section that absorbs a shock through deformation is a portion of the section and the remainder the section may be excessively reinforced more than necessary. The energy dispersion may be effectively correlated with the mounted components. Further, the effect of the reduction in costs and weight may be obtained by reducing the thickness of the excessively reinforced portion.

A detailed correlation between thicknesses of the members for each section is as follows.

TABLE 1

| | Section name | | | | | | |
|---|---|---|---|---|---|---|---|
| | Fuel tank section | | Rear subframe section | | | Tire well section | |
| | First section | Second section | Third section | Fourth section | Fifth section | Sixth section | Seventh section |
| Role | Disperse shock | Secure space | Maintain rigidity | Disperse shock | Maintain rigidity | Secure space | Secure rigidity |
| Thickness | T1 | T2 | T3 | T4 | T5 | T6 | T7 |

A thickness of the first section 301 may be a first thickness T1 and a thickness of the second section 303 may be a second thickness T2, The second thickness is greater than the first thickness (T2>T1). A thickness of the third section 305 may be a third thickness T3, a thickness of the fourth section 307 may be a fourth thickness T4, and a thickness of the fifth section 309 may be a fifth thickness T5. The fifth thickness is greater than the fourth thickness and the fourth thickness may be greater than the third thickness (e.g., T5>T4>T3). A thickness of the sixth section 311 may be a sixth thickness T6 and a thickness of the seventh section 313 may be a seventh thickness T7. The sixth thickness is greater than the seventh thickness (T6>T7).

The fuel tank sections 301 and 303 may include a first section 301 formed as the front end portions of the fuel tank sections 301 and 303 and coupled to the center floor and a second section 303 formed as the rear end portions of the fuel tank section 301 and 303, extending from the first section 301, and coupled to the rear subframe sections 305, 307, and 309. The rear subframe sections 305, 307, and 309 may include the third section 305 formed as the front end portions of the rear subframe sections 305, 307, and 309 and may be mounted with the front end fastening component of the rear subframe 207, the fourth section 307 may extend backward from the third section 305, and the fifth section 309 may extend backward from the fourth section 307, and mounted with the rear end fastening component 209 of the rear subframe 207, and may be coupled to the tire well sections 311 and 313. Further, the tire well sections 311 and 313 may include the sixth section 311 formed as the front end portions of the tire well sections 311 and 313 and extending backward from the rear subframe sections 305, 307, and 309 and the seventh section 313 may extend backward from the sixth section 311. The sixth thickness is greater than a seventh thickness, the seventh thickness is greater than the fifth thickness, the fifth thickness is greater than the fourth thickness, the fourth thickness is greater than the third thickness, the third thickness is greater than the second thickness and the second thickness may be greater than the first thickness (T6>T7>T5>T4>T3>T2>T1).

The sixth thickness may be greater than the seventh thickness, the seventh thickness may be greater than the fifth thickness, the fifth thickness may be greater than the fourth thickness, the fourth thickness may be greater than the third thickness, the third thickness may be equal to the second thickness and the second thickness may be greater than the first thickness (T6>T7>T5>T4>T3=T2>T1). The sixth thickness may be greater than the seventh thickness, the seventh thickness may be equal to the fifth thickness, the fifth thickness may be greater than the fourth thickness, the fourth thickness may be greater than the third thickness, the third thickness may be greater than the second thickness and the second thickness may be greater than the first thickness (T6>T7=T5>T4>T3>T2>T1).

The first section 301 of the rear side member 313 may be coupled with both ends of a cross member 201 crossing the vehicle body in a width direction. The thicknesses of each section may be manufactured differently by a tailor rolled blanks (TRB) method.

Moreover, based on the sections defined as described above, the sections of the rear side member 101 may be divided based on the position at which components are mounted. Additionally, the rear side member 101 may be molded to have different thicknesses based on each divided section to reduce the weight while absorbing the shock power and the space security performance upon the vehicle collision.

TABLE 2

| Component name | Existing structure | | The inventive structure | | Remarks |
| --- | --- | --- | --- | --- | --- |
| | Thickness (mm) | Weight (kg) | Thickness (mm) | Weight (kg) | |
| Rear side member | 1.6 | 10.2 | 1.0 to 1.6 | 8.7 | Apply TRB |

The related art analyzes the collision contribution based on the coupling relationship between the rear side member 101 uniformly manufactured at a single thickness with the surrounding components and is manufactured to have different thicknesses for each section by reducing the thickness of the portion excessively reinforced, thereby maximizing the absorption of the shock power and the space security performance upon the vehicle collision and reducing the weight. Comparing detailed numerical values with reference to the above Table 2, the existing rear side member 101 has a weight of about 10.2 kg but the side member according to the present invention has a weight of about 8.7 kg and therefore may obtain an effect of reduction in weight of 1.5 kg (14.7%) per vehicle.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A rear side member mounted to extend from both sides of a half portion of a vehicle body toward a rear of the vehicle, comprising:
   fuel tank sections formed as a foremost portion and corresponds to a position of the fuel tank;
   rear subframe sections that extends toward a rear of the fuel tank sections and corresponds to a position of a rear subframe; and
   tire well sections that extends backward from the rear subframe sections and corresponds to a position of a tire well,
   wherein thicknesses of members of the fuel tank sections, the rear subframe sections, and the tire well sections are different,
   wherein the fuel tank sections include a first section formed as front end portions of the fuel tank sections and coupled to a center floor and a second section formed as rear end portions of the fuel tank sections, that extends from the first section, and are coupled to the rear subframe sections, and thicknesses of members of the first section and the second section are different, and
   wherein a thickness of the first section is a first thickness and a thickness of the second section is a second thickness and the second thickness is greater than the first thickness.

2. The rear side member of claim 1, wherein the rear subframe sections include a third section formed as front end portions of the rear subframe sections and mounted with a front end fastening component of the rear subframe, a fourth section that extends backward from the third section, and a fifth section that extends backward from the fourth section, mounted with a rear end fastening component of the rear subframe, and coupled to the tire well sections, and thicknesses of members of the third section, the fourth section, and the fifth section are different.

3. The rear side member of claim 1, wherein the tire well sections include a sixth section formed as front end portions of the tire well sections and that extends backward from the rear subframe sections and a seventh section that extends backward from the sixth section, and thicknesses of members of the sixth section and the seventh section are different.

4. The rear side member of claim 2, wherein when a thickness of the third section is a third thickness, a thickness of the fourth section is a fourth thickness, and a thickness of the fifth section is a fifth thickness, wherein the fifth thickness is greater than the fourth thickness and the fourth thickness is greater than the third thickness.

5. The rear side member of claim 3, wherein when a thickness of the sixth section is a sixth thickness and a thickness of the seventh section is a seventh thickness, wherein the sixth thickness is greater than the seventh thickness.

6. The rear side member of claim 1, wherein the first section is coupled with both ends of a cross member crossing the vehicle body in a width direction.

7. The rear side member of claim 1, wherein the thicknesses for each of the fuel tank sections, the rear subframe sections, and the tire well sections are manufactured differently for each section by a tailor rolled blanks method.

8. A rear side member mounted to extend from both sides of a half portion of a vehicle body toward a rear of the vehicle, comprising:
fuel tank section formed as a foremost portion and correspond to a position of the fuel tank;
rear subframe sections that extend toward a rear of the fuel tank sections and correspond to a position of a rear subframe; and
tire well suctions that extend backward from the rear subframe sections and correspond to a position of a tire well,
wherein thicknesses of members of the fuel tank sections, the rear subframe sections, and the tire well sections are different,
wherein the fuel tank sections include a first section formed as front end portions of the fuel tank sections and coupled to a center floor and a second section being rear end portions of the fuel tank sections, that extends from the first section, and coupled to the rear subframe sections,
wherein the rear subframe sections include a third section formed as front end portions of the rear subframe sections and mounted with a front end fastening component of the rear subframe, a fourth section that extends backward from the third section, and a fifth section that extends backward from the fourth section, mounted with a rear end fastening component of the rear subframe, and coupled to the tire well sections,
wherein the tire well sections include of a sixth section formed as front end portions of the tire well sections and that extends backward from the rear subframe sections and a seventh section that extends backward from the sixth section,
wherein a thickness of the first section is a first thickness, a thickness of the second section is a second thickness, a thickness of the third section is a third thickness, a thickness of the fourth section is a fourth thickness, a thickness of the fifth section is a fifth thickness, a thickness of the sixth section is a sixth thickness, and a thickness of a seventh section is a seventh thickness, and
wherein the sixth thickness is greater than the seventh thickness, the seventh thickness is greater than the fifth thickness, the fifth thickness is greater than the fourth thickness, the fourth thickness is greater than the third thickness, the third thickness is greater than the second thickness and the second thickness is greater than the first thickness.

9. A rear side member mounted to extend from both sides of a half portion of a vehicle body toward a rear of the vehicle, comprising:
fuel tank sections formed as a foremost portion and correspond to a position of the fuel tank;
rear subframe sections that extend toward a rear of the fuel tank sections and correspond to a position of a rear subframe; and
tire well sections that extend backward from the rear subframe sections and correspond to a position of a tire well,
wherein thicknesses of members of the fuel tank sections, the rear subframe sections, and the tire well sections are different,
wherein the fuel tank sections include a first section formed as front end portions of the fuel tank sections and coupled to a center floor and a second section being rear end portions of the fuel tank sections, that extends form the first section, and coupled to the rear subframe sections,
wherein rear subframe sections include a third section formed as front end portions of the rear subframe sections and mounted with a front end fastening component of the rear subframe, a fourth section that extends backward from the third section, and a fifth section that extends backward from the fourth section, mounted with a rear end fastening component of the rear subframe, and coupled to the tire well sections,
wherein the tire well sections include a sixth section formed as front end portions of the tire well sections and that extend backward from the rear subframe sections and a seventh section that extends backward from the sixth section,
wherein, a thickness of the first section is a first thickness, a thickness of the second section is a second thickness, a thickness of the third section is a third thickness, a thickness of the fourth section is a fourth thickness, a thickness of the fifth section is a fifth thickness, a thickness of the sixth section is a sixth thickness, and a thickness of the seventh section is a seventh thickness, and
wherein the sixth thickness is greater than the seventh thickness, the seventh thickness is greater than the fifth thickness, the fifth thickness is greater than the fourth thickness, the fourth thickness is greater than the third thickness, the third thickness is equal to the second thickness and the second thickness is greater than the first thickness.

10. A rear side member mounted to extend from both sides of a half portion of a vehicle body toward a rear of the vehicle, comprising:
fuel tank sections formed as a foremost portion and correspond to a position of the fuel tank;
rear subframe sections that extend toward a rear of the fuel tank sections and correspond to a position of a rear subframe; and
tire well sections that extend backward from the rear subframe sections and correspond to a position of a tire well,
wherein thicknesses of members of the fuel tank sections, the rear subframe sections, and the tire well sections are different, wherein the fuel tank sections include a first section formed as front end portions of the fuel tank sections and coupled to a center floor and a second section being rear end portions of the fuel tank sections, that extend from the first section, and coupled to the rear subframe sections, wherein the rear subframe sections include a third section formed as front end portions of the rear subframe sections and mounted with a front end fastening component of the rear subframe, a fourth section that extends backward from the third section, and a fifth section that extends backward from the fourth section, mounted with a rear end fastening component of the rear subframe, and coupled to the tire well sections, wherein the tire well sections include a sixth section formed as front end portions of the tire well sections and that extends backward from the rear subframe sections and seventh section that extends backward from the sixth section, wherein a thickness of the first section is a first thickness, a thickness of the second section is a second thickness, a thickness of the third section is a third thickness, a thickness of the fourth section is a fourth thickness, a thickness of the fifth section is a fifth thickness, a thickness of the sixth section is a sixth thickness, and a thickness of the seventh section is a seventh thickness, and wherein the sixth thickness is greater than the seventh thickness, the seventh thickness equal to the fifth thickness, the fifth thickness is greater than the fourth thickness, the fourth thickness is greater than the third thickness, the third thickness is greater than the second thickness and the second thickness is greater than the first thickness.

* * * * *